April 18, 1967  R. L. OWENS  3,314,698
COUPLING
Filed Aug. 20, 1964  2 Sheets-Sheet 2
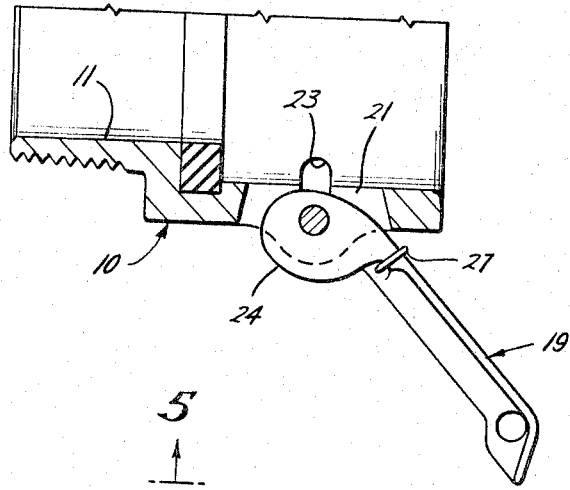
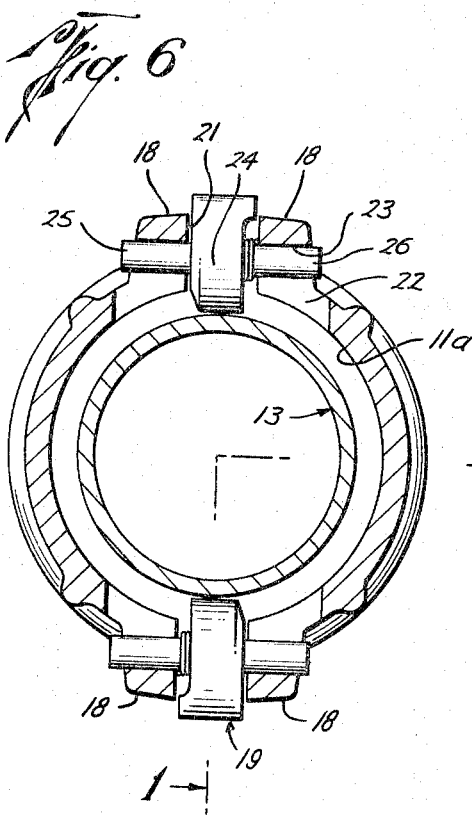
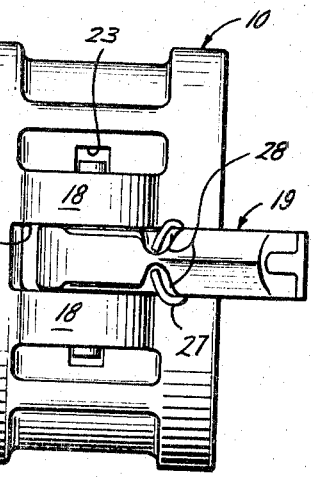
Robert L. Owens
INVENTOR.
BY
ATTORNEYS Patented Apr. 18, 1967

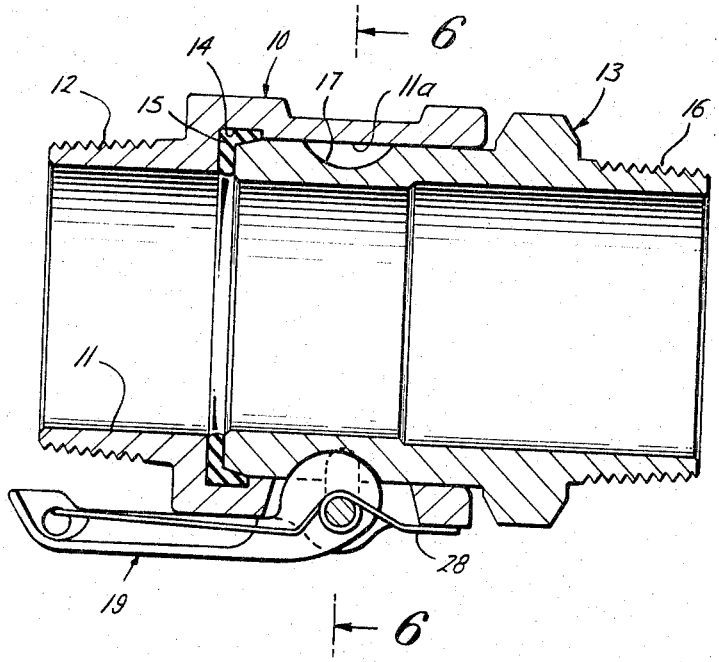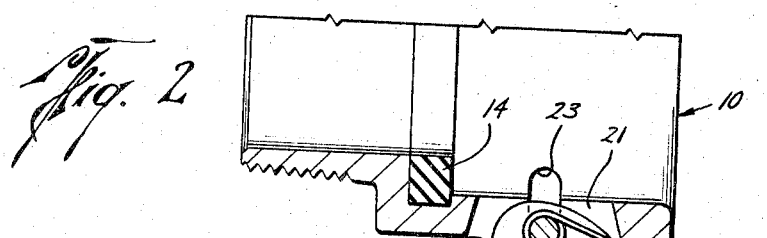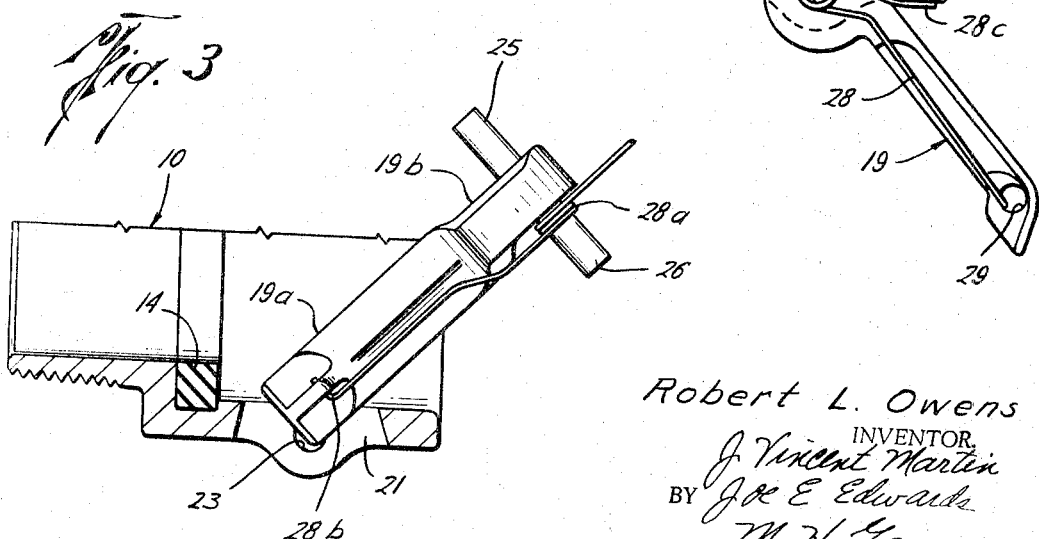

3,314,698
COUPLING
Robert L. Owens, Houston, Tex., assignor to White Manufacturing Co., Houston, Tex., a corporation of Texas
Filed Aug. 20, 1964, Ser. No. 390,869
5 Claims. (Cl. 285—312)

This invention relates to quick release couplings.

One form of quick release coupling usually includes a coupler and an adapter or male member which is held in place by a cam arm. This cam arm has traditionally been pinned between ears by a conventional hinge pin inserted through the ears and cam arm during assembly. The pin must fit snugly and be hammered in place to prevent accidental dislodgment. This presents difficulties when it is attempted to remove the pin to replace the cam arms. This construction is also expensive to assemble.

An object of this invention is to provide a quick release coupling which is easier and less expensive to manufacture than those previously available.

Another object is to provide a quick release coupling with a cam arm structure in which hinge pins are made up as a part of the arm before being inserted in hinge slots to simplify construction.

Another object is to provide a quick release coupling with cam arms as described above wherein the arms are held in hinge slots by springs which urge the arms toward locked position.

Other objects, features and advantages of the invention will be apparent from the claims, the specification and the drawings.

In the drawings, wherein like reference numerals indicate like parts, and wherein an illustrative embodiment of this invention is shown;

FIGURE 1 is a view partly in cross-section and partly in elevation through a coupling assembly made in accordance with this invention, taken along the line 1—1 of FIGURE 6;

FIGURE 2 is a quarter-section view of the coupler of FIGURE 1 showing the cam arm in elevation and in open position;

FIGURE 3 is a quarter-section view of the coupler of FIGURE 1 showing the cam arm in elevation being inserted through the slot between the hinge ears;

FIGURE 4 is a quarter-section view of the coupler similar to FIGURE 2 but showing a different means for preventing removal of the cam arm;

FIGURE 5 is a view along the line 5—5 of FIGURE 4; and,

FIGURE 6 is a view along the line 6—6 of FIGURE 1.

The coupler indicated generally at 10 is tubular in form having a bore 11 therethrough. On one end of the coupler suitable means may be provided for attaching the coupler to a conduit. In the illustrated form, this means is the tapered thread 12.

The bore 11 is enlarged at 11a to receive the male member or adapter 13.

At the base of the enlargement 11a the bore is further enlarged at 14 to provide a seal receiving recess. A suitable seal member 15 of resilient material is provided in the recess and is compressed by the adapter 13 when the parts are fully made up to seal between the coupler 10 and adapter 13 (note the seal in its undistorted form in FIGURE 2).

The male member 13 may be the adapter or it may be the end of a tubular pipe adapted to be attached to the coupler. In the form illustrated the adapter includes the tapered thread 16 which will permit the adapter to be secured to a length of pipe.

In order to secure the adapter to the coupler, it is provided with an annular concave recess 17 which is positioned within the bore 11a when the parts are assembled.

In accordance with this invention, one or more pairs of ears 18 are provided on the coupler 10. These ears are mirror images of each other.

In order to receive the cam arm indicated generally at 19, an axial slot 21 is provided between the ears which extends completely through the wall of the coupler.

A second slot 22 is provided in the coupler and extends transversely to the slot 21. This slot extends from the inner bore 11a of the coupler to a point 23 in the ears 18. The point or surface 23 provides with the side walls of the slot 22 a hinge surface.

A suitable cam member 19 is provided with a cam surface 24 on one end thereof. The cam arm is also provided with a pair of hinge pins 25 and 26 which may be formed integral with the cam arm or may be provided by a single pin driven through a tight opening in the arm.

The dimension of the two hinge pins is less than the width of the slot 22 as shown in FIGURE 6. Also, the width of the cam section 24 of the arm is less than the width of slot 21 so that the end of the arm 19a which is remote from the cam surface can be inserted through slot 21 from the interior of the coupler to a position in which the hinge pins engage the slot 23. If desired, the cam arm may have one width dimension which is less than the length of slot 21 but greater than the width of slot 21 to provide a broad handle as shown in FIGURE 5. When this form is employed, the arm narrows down as at 19b (FIGURE 3) to permit the arm to be inserted through slot 21 and then rotated to an orientation for engagement of the hinge pins 25 and 26 with slot 23.

In order to hold the cam arm in position, any suitable means may be employed. In FIGURES 4 and 5, a simple clamp ring 27 is clamped about the cam arm and is held in place by having the free ends thereof extend into suitable slots 28. This ring 27 is greater in dimension than the slot 21 and is clamped about the cam arm in a position closely adjacent the ears 18 to thus hold the cam arm in place.

As an alternative, the spring 28 may be employed. This spring has a section 28a coiled about hinge pin 27 and has a hook 28b on one end for engagement in hole 29 in the free end of the cam arm. The other end 28c of the spring is free. The spring is held under tension with the free end 28c adjacent the cam arm when the arm is inserted into slot 21. When the free end 28 is released, it engages the outer surface of the coupler and urges the arm toward a position to hold the adapter 16 against the seal 15 as shown in FIGURE 1. This spring performs a dual function of holding the cam arm in locked position and additionally holding the cam arm in its slot as illustrated in FIGURES 1 and 2.

From the above it will be seen that the objects of this invention have been obtained. The coupler may be cast with the grooves 21 and 22, thus eliminating the need for boring holes through the ears 18 as has been the past practice. The cam arm may be made from a single piece of metal with the pins an integral part thereof to avoid the need for boring a hole in the cam arm and driving the hinge pin through the hole. Of course, if desired, the hinge pin could be separate from the cam arm and held in a tight hole in the arm. The elimination of the need for machining and boring these parts, as well as the ease of assembly and replacement of the cam arm, greatly reduces the cost of the coupling.

The foregoing disclosure and description of the invention is illustrative and explanatory thereof and various changes in the size, shape and materials, as well as in the details of the illustrated construction, may be made without in the scope of the appended claims without departing from the spirit of the invention.

What is claimed is:
1. A pipe coupling assembly comprising:
a tubular coupler;
a male member insertable into the coupler;
an annular concave recess in the outer periphery of the male member;
means for sealing between the coupler and male member;
at least one pair of ears extending radially outwardly from the outer walls of said coupler;
a first slot between said ears extending axially of the coupler and completely through the wall of the coupler between said ears;
a second slot in said coupler transverse to and intersecting said first slot, said second slot opening into the bore through the coupler and extending to said ears whereby an opening transverse of the axis of said coupler is formed, one wall of said opening being defined by radially inward surfaces of said ears;
a cam arm including a cam surface on one end thereof for entry into said recess and hinge pins rigid with and extending from opposite sides of the arm, said pins being of less length than the distance between the end walls forming said second slot, but of greater length than the distance between the walls of said first slot;
the end of said arm remote from the cam surface adapted to be inserted into the bore of the coupler and passed through said first slot until said hinge pins engage said radially inner surface of said ears through said second slot;
and means on said arm engageable with said coupler for retaining said arm between said ears.
2. The coupler of claim 1 wherein there are a pair of ears, first and second slots, and cam arms held in the ears with the arms on diametrically opposite sides of the coupler.
3. The assembly of claim 1 wherein the means for preventing removal of the arm from between the ears also biases the arm toward closed position in which the cam holds the male member in place in the coupler.
4. A coupler comprising:
a tubular body;
at least one pair of ears extending radially outwardly from the outer walls of said coupler;
a first slot between said ears extending axially of the coupler and completely through the wall of the coupler between said ears;
a second slot in said coupler transverse to and intersecting said first slot, said second slot opening into the bore through the coupler and extending to said ears whereby an opening transverse of the axis of said coupler is formed, one wall of said opening being defined by radially inward surfaces of said ears;
a cam arm including a cam surface on one end thereof for entry into said recess and hinge pins rigid with and extending from opposite sides of the arm, said pins being of less length than the distance between the end walls forming said second slot, but of greater length than the distance between the walls of said first slot;
the end of said arm remote from the cam surface adapted to be inserted into the bore of the coupler and passed through said first slot until said hinge pins engage said radially inner surfaces of said ears through said second slot;
and means on said arm engageable with said coupler for retaining said arm between said ears.
5. The coupler of claim 4 wherein there are a pair of ears, first and second slots, and cam arms held in the ears with the arms on diametrically opposite sides of the coupler, and the means for preventing removal of the arms from between the ears are provided by springs biasing the arms toward a position extending the cams into the bore within the coupler.

References Cited by the Examiner
UNITED STATES PATENTS

| | | | |
|---|---|---|---|
| 2,478,586 | 8/1949 | Krapp | 285—312 |
| 2,757,944 | 8/1956 | Krapp | 285—374 X |

FOREIGN PATENTS

| | | |
|---|---|---|
| 1,245,874 | 10/1960 | France. |
| 1,364,735 | 5/1964 | France. |

CARL W. TOMLIN, *Primary Examiner.*

T. A. LISLE, T. CALLAGHAN, *Assistant Examiners.*